United States Patent [19]

Kawamura et al.

[11] Patent Number: 4,826,748

[45] Date of Patent: May 2, 1989

[54] ELECTROPHOTOGRAPHIC SENSITIVE MEMBER

[75] Inventors: Takao Kawamura, 17-11, Takakura-dai 1-chome, Sakai-shi, Osaka; Yoshikazu Nakayama, Hirakata, both of Japan

[73] Assignees: Kyocera Corporation, Kyoto; Takao Kawamura, Osaka, both of Japan

[21] Appl. No.: 82,971

[22] Filed: Aug. 4, 1987

Related U.S. Application Data

[63] Continuation of Ser. No. 785,892, Oct. 8, 1985, abandoned.

[30] Foreign Application Priority Data

Oct. 11, 1984 [JP] Japan ................... 59-213663

[51] Int. Cl.$^4$ ............................................. G03G 5/14
[52] U.S. Cl. ...................................... 430/60; 430/945
[58] Field of Search ..................... 430/59, 60, 84, 95, 430/945

[56] References Cited

U.S. PATENT DOCUMENTS

| | | | |
|---|---|---|---|
| 4,060,322 | 11/1977 | Hirayama et al. ................... | 355/60 |
| 4,359,512 | 11/1982 | Fukuda et al. ....................... | 430/57 |
| 4,461,819 | 7/1984 | Nakagawa et al. ................... | 430/59 |
| 4,491,626 | 1/1985 | Kawamura et al. .................. | 430/69 |
| 4,654,285 | 3/1987 | Nishiguchi ........................... | 430/69 |

FOREIGN PATENT DOCUMENTS 82249  5/1983  Japan ................................ 430/945

OTHER PUBLICATIONS

Jacobs "Applied Optics" vol. 17 #13 2001-2006 7/1/78.

Primary Examiner—John L. Goodrow
Attorney, Agent, or Firm—Spensley Horn Jubas & Lubitz

[57] ABSTRACT

The present invention relates to an electrophotographic sensitive member for use in a laser line printer.

A laser line printer using a laser beam as a recording member has been known for a small-sized, light, low power consumption, high-density and high-speed recording method. For example, a semi-conductor laser printer and an electrophotographic sensitive member mainly formed of amorphous silicon used therein are being watched with interest.

However, since this laser beam is monochromatic, a laser beam incident upon the inside of a photosensitive layer is very much inclined to be not sufficiently absorbed by the photosensitive layer to reach an electrically conductive substrate and be reflected at the surface of the electrically conductive substrate.

With a photosensitive member having a photosensitive layer laminated on an electrically conductive substrate, there has been a problem in that a part of an incident ray such as a semiconductor laser ray is reflected by the electrically conductive substrate and if a part of this reflected ray is reflected by the surface of the photosensitive layer again, an interference occurs between this twice reflected ray and the incident ray to produce an interference fringe on a charge latent image whereby an interference fringe-like concentration unevenness on the image after developing.

The present invention was achieved in order to eliminate the above described problem and it is an object of the present invention to provide an electrophotographic sensitive member, in which a photosensitive layer having at least a photoconductive layer is laminated on an electrically conductive substrate and a laser beam is incident upon a surface side of said photosensitive layer to generate an optical carrier in said photoconductive layer, characterized by that an interference of an laser beam can be reduced to prevent a stripped pattern from generating on an image by forming said photosensitive layer on said electrically conductive substrate through an intermediate layer and selecting a $\times b^2 \times c$ of 0.2 or less, wherein a is a transmission factor of said laser beam through said photosensitive layer, b being a transmission factor of said laser beam through said intermediate layer, and c being a reflection factor of said laser beam by said substrate.

9 Claims, 6 Drawing Sheets

ELECTROPHOTOGRAPHIC SENSITIVE MEMBER

This is a continuation of application Ser. No. 06/785,892 filed on Oct. 8, 1985 now abandoned.

DETAILED DESCRIPTION OF THE INVENTION

INDUSTRIAL FIELD OF USE

The present invention relates to an electrophotographic sensitive member.

Recently, a laser line printer using a laser beam as a recording member has been known for a small-sized, light, low power consumption, high-density and high-speed recording method. For example, a semiconductor laser printer and an electrophotographic sensitive member mainly formed of amorphous silicon (hereinafter simply referred to as a—Si) used therein are being watched with interest.

PROBLEM TO BE SOLVED BY THE INVENTION

However, since this laser beam is monochromatic, a laser beam incident upon the inside of a photosensitive layer is very much inclined to be insufficiently absorbed by the photosensitive layer to reach an electrically conductive substrate and be reflected at the surface of the electrically conductive substrate whereby the following problem has occurred.

Figure 2:
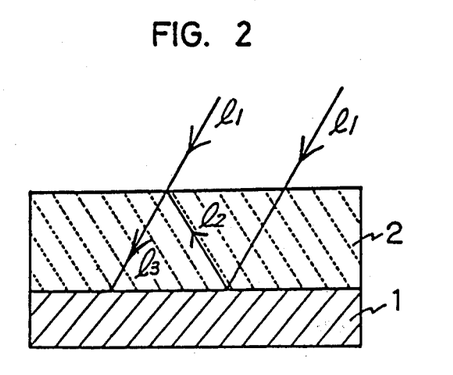
FIG. 2 is a diagram showing an electrophotographic sensitive member in which an interference occurs.

That is to say, with a photosensitive member having a photosensitive layer 2 laminated on an electrically conductive substrate 1, as shown in FIG. 2, a part of an incident ray $\lambda_1$ such as a semiconductor laser beam is reflected by the electrically conductive substrate 1 and if a part of this reflected ray $\lambda_2$ is reflected by the surface of the photosensitive layer 2 again, an interference occurs between this twice relfected ray $\lambda_3$ and the incident ray $\lambda_1$ to produce an interference fringe on a charge latent image whereby an interference fringe-like concentration unevenness is generated on the image after developing.

OBJECT OF THE INVENTION

The present invention was achieved in view of the above described matter and it is an object of the present invention to provide an electrophotographic sensitive member in which an interference of an laser beam can be reduced to prevent a striped pattern from generating on an image.

Although an electrophotographic sensitive member for use in a laser printer, in which an interference fringe-like concentration unevenness is prevented from generating was already disclosed in Japanese Patent Application Laid-Open No. 58-10013, the present invention provides a further improved electrophotographic sensitive member.

SUMMARY OF THE INVENTION

According to the present invention, an electrophotographic sensitive member, in which a photosensitive layer having at least a photoconductive layer is laminated on an electrically conductive substrate and a laser beam is incident upon a surface side of said photosensitive layer to generate an optical carrier in said photoconductor layer, characterized by that said photosensitive layer is formed on said electrically conductive substrate through an intermediate layer and the value of $a \times b^2 \times c$ is selected so as to be 0.2 or less, wherein a is a transmission factor of said laser beam through said photosensitive layer, b being a transmission factor of said laser beam through said intermediate layer, and c being a reflection factor of said laser beam by said substrate, is provided.

MEASURES FOR SOLVING THE PROBLEM

The present invention will be in more detail described below with reference to the drawings.

Figure 1:
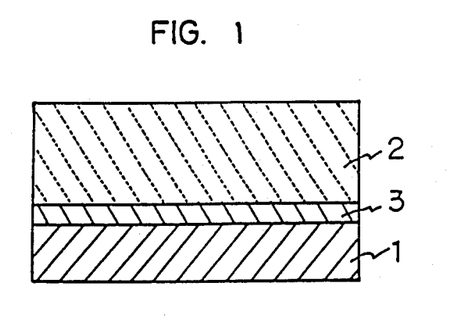
FIGS. 1 and 8 are an enlarged sectional view showing an electrophotographic sensitive member according to the present invention.

With an electrophotographic sensitive member for use in a laser line printer according to the present invention, depending upon also a transmission wave length of a laser beam, as shown in FIG. 1, in the event that the photosensitive layer 2 having a transmission factor of said laser beam therethrough of a is laminated on the substrate 1 having a reflection factor of said laser beam of c through the intermediate layer 3 having a transmission factor of said laser beam therethrough of b, if the value of $a \times b^2 \times c$ is set so as to be 0.2 or less, the object of the present invention can be achieved almost regardless of lamination form of the photosensitive layer 2, photosensitive material and substrate material. That is to say, it was found that a bad influence of a striped pattern upon an image quality desired for an electrophotographic sensitive member for use in a laser line printer was almost negligible whereby no practical hindrance occurred. Furthermore, it was found from the present inventors' repeated various kinds of experiment that if the value of $a \times b^2 \times c$ was set so as to be 0.1 or less, a remarkably superior image, on which a striped pattern can not be confirmed at all with the naked eye, could be obtained.

The transmission factor a is expressed by a ratio of the strength of a laser beam, which passed through the photosensitive layer 2, to the strength of said laser beam incident upon an electrophotographic sensitive member.

Also, the transmission factor b is a ratio of the strength of a laser beam, which passed through the intermediate layer 3, to the strength of said laser beam, which passed through the photosensitive layer 2, or a ratio of a laser beam, which passed through the intermediate layer 3, to the strength of said laser beam, which was reflected by the substrate 1. The present inventors think that there is no practical difference between both of them in view of achieving the object of the present invention.

According to the present invention, said intermediate layer 3 is formed as an absorption layer for reducing the strength of a laser beam, which passed through the photosensitive layer 2, and every intermediate layer 3 suitable for this object may be used. For example, with the photosensitive layer 2 formed of an a—Si photoconductive material as shown in an embodiment which will be described later, in order to improve a problem that a—Si has in general a small light-absorption coefficient per se, it is desirable that the intermediate layer 3 having a comparatively large light-absorption coefficient is formed. Also, in order to make use of an advantage that a plasma CVD apparatus same as in the production an a—Si photoconductive material can be used, an appointed amount of additive can be added to a—Si to form the intermediate layer 3 having the transmission factor b set within an appointed range.

The present inventors found it from their repeated various kinds of experiment that Al, Zn, Sn, Ge and the like are suitable for additives for increasing a light-absorption coefficient of a—Si. These additives are added singly or in combination. Also, it was found that the a—Si intermediate layer 3 can be easily formed by supplying an a—Si manufacturing plasma CVD apparatus with an appointed amount of these additives calculated as organic metal along with SiH4, gas and the like.

Said additives include $Al(CH_3)_3$, $Al(C_2H_5)_3$, $Al(C_6H_5)_3$, $AlCl_3$, $Zn(CH_3)_2$, $Zn(C_2H_5)_2$, $Zn(C_6H_5)_2$, $Sn(CH_3)_4$, $Sn(C_2H_5)_4$, $GeH_4$, $Ge(CH_3)_3$, $Ge(C_2H_5)_3$ and the like.

Also, the addition of B and the like to the a—Si intermediate layer 3 according to the present invention leads to an improvement in conductance whereby the a—Si photosensitive layer 2 having superior photoelectric characteristics can be provided.

Also, the present invention can be applied to various kinds of recording member over a transmission wave length of 400 to 850 nm such as a He—Ne gas laser whose transmission wave length of about 633 nm and a He—Cd gas laser whose tranmission wave length of about 442 nm. For example, an electrophotographic sensitive member comprising an a—Si photoconductive layer having superior photosensitive characteristics in a near infrared range of about 800 nm is suitable for a laser line printer using a semiconductor laser having a transmission wwave length of about 750 to 800 nm, that is, a transmission wave length more than 700 nm, as a recording member.

Various kinds of photosensitive layer can be used in an electrophotographic sensitive member. Also, there is no especial reason for limiting the substrate to aluminium. However, an a—Si electrophotographic sensitive member having an a—Si photosensitive layer formed on an aluminium substrate will be described in a preferred embodiment of the present invention.

Figure 3:
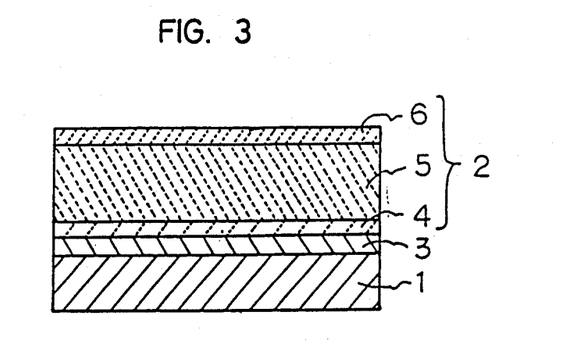
FIGS. 3 and 4 are enlarged sectional views showing electrophotographic sensitive members according to an embodiment of the present invention, respectively.

An a—Si electrophotographic sensitive member according to the present invention may have various kinds of layer construction and there is no especial reason for limiting their constituent materials to some special ones. However, the present inventors used an a—Si photosensitive layer of layer construction as shown in FIGS. 3 and 4 in an embodiment which will be described later.

That is to say, an a—Si electrophotographic sensitive member according to the present invention is characterized by that the intermediate layer 3, a barrier layer 4, the photoconductive layer 5 and a surface-protecting layer 6 as the photosensitive layer 2, are laminated on the Al-substrate 1 in this order and every layer is formed of a—Si.

Figure 4:
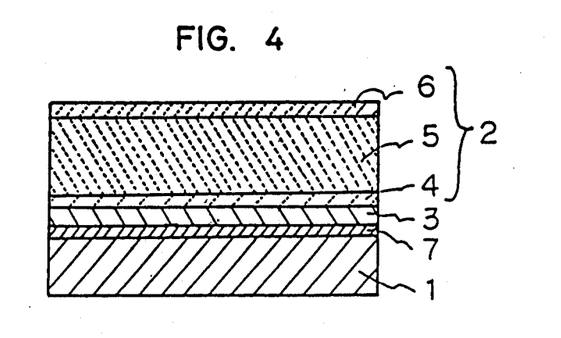

Also, an Al-contained layer 7 containing Al as a principal ingredient is preferably formed on the Al-substrate 1, as shown in FIG. 4. That is to say, although it was found by the present inventors that Al is added to this intermediate layer 3 in the formation of the a—Si intermediate layer 3 in an a—Si electrophotographic sensitive member, as above described, Al, which is a metallic ingredient of the substrate, can be coated on the substrate by vaporization by plasma decomposing mainly organic metallic gases without supplying an a—Si forming gas such as $SiH_4$ in a plasma CVD apparatus, which provides Al in the form of an organic metal.

Accordingly, it was confirmed by the present inventors' experiments that the following problems can be solved in such a—Si electrophotographic sensitive member. That is to say, separation and cracks due to a difference between the Al-substrate and the a—Si photosensitive layer in thermal expansion coefficient have generated in the a—Si photosensitive layer with an increase of an operating time, so that it was intended to reduce a stress generated within the a—Si photosensitive layer 2 by the interposition of the Al-contained layer 7. A thickness of the Al-contained layer 7 is preferably at least 1000 Å. Also, it was confirmed from the present inventors' various kinds of experiment that such an effect could be still more remarkably improved by laminating the a—Si intermediate layer 3 on the Al-contained layer 7, as shown in FIG. 4.

Next, an a-Si electrophotographic sensitive member and a method of producing same disclosed in the present applicant's former application (Japanese patent application No. 59-11495) and used in an embodiment, which will be described later, will be described.

Table 1 shows a composition and a thickness of the a—Si photosensitive layer 2.

TABLE 1

| Kind of layer | Layer thickness (μm) | Content Oxygen and nitrogen cont. (atomic %) | Hydrogen cont. (atomic %) | Boron cont. (ppm) |
|---|---|---|---|---|
| Surface protective layer (6) | 0.05~1.0 | to be described later | 10~40 | 0~20000 |
| Photoconductive layer (5) | 5~100 | $10^{-5}$~5 × $10^{-2}$ | 10~40 | 10~20000 |
| Barrier layer (4) | 0.2~5.0 | to be described later | 10~40 | 50~500 |

The barrier layer 4 contains oxygen and nitrogen in a progressively decreasing pattern throughout the formation thereof, such content being 0.1 to 30 atomic % in total at the start point of the layer formation. The oxygen and nitrogen content of the barrier layer 4 at the ending portion thereof is of same level as the oxygen and nitrogen content of said photoconductive layer 5.

In addition, the oxygen and nitrogen content of the surface protective layer 6 is such that oxygen and nitrogen are distributed in a progressively increasing pattern throughout the formation thereof, so that the oxygen and nitrogen content at the ending portion of the layer amounts to 1.0 to 60.0 atomic % in total. The oxygen and nitrogen content of the surface protective layer 6 at the start point of the layer formation is same level as the oxygen and nitrogen content of said photoconductive layer 5.

Since the barrier layer of an a—Si electrophotographic sensitive member according to the present invention contains oxygen and nitrogen in a progressively decreasing pattern throughout the formation thereof, such content being 0.1 to 30 atomic % in total at the start point of the layer formation, carriers produced in the photoconductive layer can be smoothly transported to the electrically conductive substrate and also the injection of electric charges from the electrically conductive substrate can be inhibited. Furthermore, an excellent electrophotographic sensitive member, in which the photosensitivity to near infrared rays is heightened due to the addition of oxygen, nitrogen and boron and the residual electric potential disappears whereby the photosensitivity to near infrared rays is not lowered in the event that the oxygen and nitrogen content is maximum at the interface of the barrier layer and the electrically conductive substrate and progressively reduced from this interface whereby a layer thickness of the maximum oxygen and nitrogen content is nearly zero, can be provided.

In addition, referring to the surface protective layer, subsequently to the formation of the photoconductive layer, it contains oxygen and nitrogen in a progressively increasing pattern, such content being 1.0 to 60.0 atomic % in total at the outer surface, so that $SiO_2$ and $Si_3N_4$ are formed to remarkably increase the surface hardness and also, an electrophotographic sensitive member having an improved charge holding capability with maintaining high photosensitivity can be provided.

Nextly, a glow discharge decomposition apparatus of capacitive coupling type for production of an a—Si electrophotographic sensitive member having excellent photoelectric characteristics will be described with reference to FIG. 5.

In the figure, first, second, and third tanks 7, 8, 9 have $SiH_4$, $B_2H_6$, and $N_2O$ gases enclosed therein. Carrier gas for both $SiH_4$ and $B_2H_6$ gases is hydrogen. These gases are discharged by releasing corresponding first, second, and third regulating valves 10, 11, 12. Gases from the first and second tanks 7, 8 are fed into a first main pipe 16, and $N_2O$ gas from the third tank 9 is fed into a second pipe 17, with their flow rates regulated by mass flow controllers 13, 14, 15. Shown by numerals 18, 19 are stop valves. Gases flowing through the first and second main pipes 16, 17 are introduced into a reaction tube 20. Around a base plate inside the reaction tube 20, there are disposed capacitive coupling type discharge electrodces 21, of which high-frequency power and frequency may be suitably set at 50 watts to 3 kilowatts and one MHz to several tens MHz.

Inside the reaction tube 20 and on a turntable 24 rotatable by a motor 23 there is mounted a base plate 22 of such material as aluminium on which an a—Si layer is to be formed. The base plate 22 is uniformly heated by a suitable heating means to about 50° to 350° C., preferably about 150° to 300° C., per se. In addition, the interior of the reaction tube 20, in which high vacuum (discharge pressure 0.1 to 2.0 Torr) is required during the forming operation of an a—Si layer, communicates with a rotary pump 25 and a diffusion pump 26.

Also, a fourth tank 27 has $H_2$ gas tightly enclosed therein. A bubbler 28 contains trimethyl aluminium $Al(CH_3)_3$, triethyl aluminium $Al(C_2H_5)_3$ and the like, which are materials for providing Al, stored therein. These materials are fed through a third main pipe 29 in case of need and the flow rate thereof is set by a temperature of the bubbler 28 controlled by means of a thermostatic bath 30 (usually 15° to 60° C.), the flow rate of hydrogen fed from the fourth tank 27 controlled by means of a mass flow controller 31, and a pressure within the bubbler 28 set by means of a fourth regulating valve 32 (usually about atmospheric pressure).

Where such glow discharge decomposition apparatus is employed, operation for forming oxygen and nitrogen containing a—Si films on the base plate 32 is carried out by releasing the first and third regulating valves 10, 12 to discharge $SiH_4$ gas from the first tank 7 and $N_2O$ gas from the third tank 9. In order to have boron contained in the films, also the second regulating valve 11 is released to discharge $B_2H_6$ from the second tank 8. The rates of discharge are regulated by mass flow controllers 13, 14, 15. $SiH_4$ gas or $SiH_4$—$B_2H_6$ mixture gas is fed through the first main pipe 16, and concurrently $N_2O$ gas of a certain molar ratio to $SiH_4$ through the second main pipe 17, into the reaction tube 20. The interior of the reaction tube 20 is kept vacuum, 0.1 to 2.0 Torr, the temperature of the base plate is maintained at 50° to 350° C., and high-frequency power and frequency for the capacitive type discharge electrodes 21 are set at 50 watts to 3 kilowatts and one to several tens MHz, so that glow discharge takes place and gases are decomposed, and accordingly on the base plate are formed a—Si films containing oxygen, nitrogen and hydrogen, and also a—Si films containing an appropriate amount of boron, at a rate of about 10 to 2500 Å/min.

Also, in order to form the Al-contained layer 7, $Al(CH_3)_3$ or $Al(C_2H_5)_3$ is fed into the reaction tube 20 through the third main pipe 29. Furthermore, in order to form the a—Si intermediate layer 3, also $SiH_4$ gas is fed through the first main pipe 16.

Figure 5:
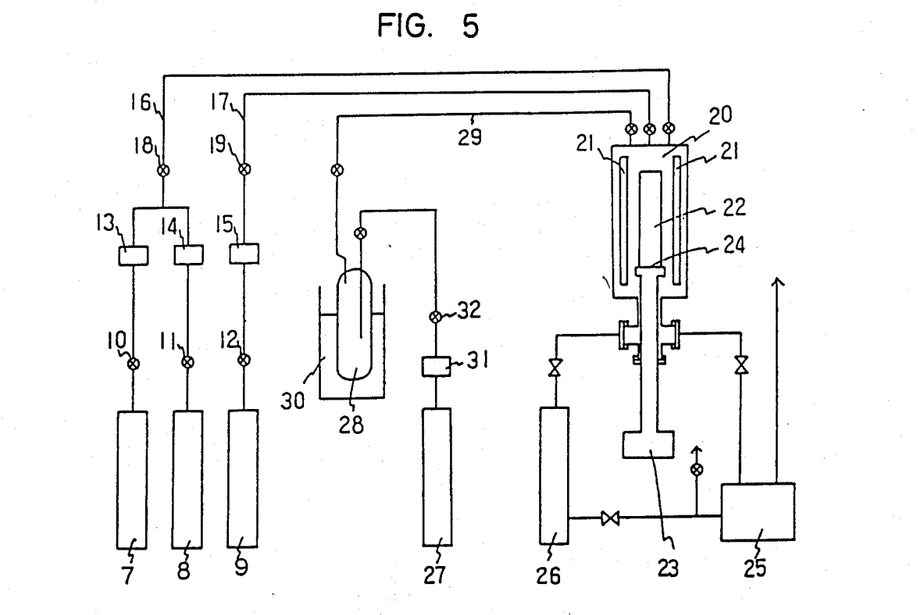
FIGS. 5 and 9 are a diagram showing a glow discharge decomposition apparatus for producing an electrophotographic sensitive member according to the present invention.

In addition, although a glow discharge decomposition apparatus shown in FIG. 5 is a capacitive coupling type, also a direct current- or induction coupling type one can achieve an object of the present invention.

Nextly, a capacitive coupling type glow discharge decomposition apparatus shown in FIG. 9, which is used in another embodiment where $GeH_4$ gas is used for the production of an intermediate layer in the manufacture of an a—Si electrophotographic sensitive member having excellent photoelectric characteristics according to the present invention, will be described.

Figure 9:
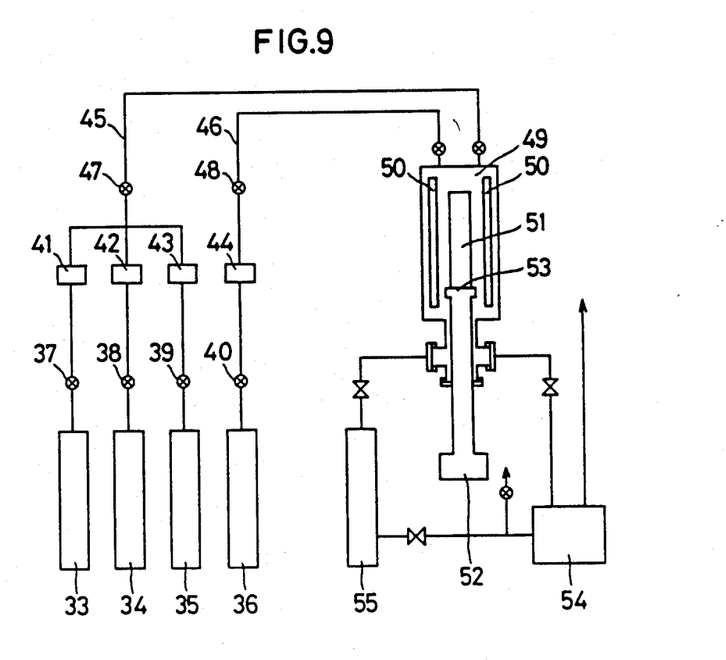

Referring to FIG. 9, a first, second, third, and fourth tank 33, 34, 35, 36 has $SiH_4$, $GeH_4$, $B_2H_6$, and NO or $CH_4$ gas tightly enclosed therein, respectively.

Also, carrier gas for $SiH_4$, $GeH_4$ and $B_2H_6$ gases is hydrogen. These gases are discharged by releasing corresponding first, second, third, and fourth regulating valves 37, 38, 39, 40. Their flow rates are regulated by mass flow controllers 41, 42, 43, 44. Gases from the first, second and third tanks 33, 34, 35 are fed into a first main pipe 45 and also, oxygen gas from the fourth tank 36 is fed into a second main pipe 46.

In addition, shown by numerals 47, 48 are stop valves. Gases flowing through the first and second main pipes 45, 46 are introduced into a reaction tube 49. Around a base plate inside the reaction tube 49, there are disposed capacitive coupling type discharge electrodes 50, of which high-frequency power and frequency may be suitably set at 50 watts to 3 kilowatts and one to several tens MHz. Inside the reaction tube 49 and on a turntable 53 rotatable by a motor 52 there is mounted a base plate 51 of such material as aluminium or NESA glass on which a—Si films are to be formed. The base plate 51 is uniformly heated by a suitable heating means to about 50° to 350° C., preferably about 150° to 300° C., per se, and also, the interior of the reaction tube 49, in which high vacuum (discharge pressure 0.1 to 2.0 Torr) is required during the forming operation of a—Si films, communicates with a rotary pump 54 and a diffusion pump 55.

Where such glow discharge decomposition apparatus is employed, operation for forming for example oxygen containing a—Si films on the base plate 51 is carried out by releasing the first and fourth regulating valves 37, 40 to discharge $SiH_4$ gas from the first tank 33 and NO gas or $CH_4$ gas from the fourth tank 36. In order to have boron contained in the films, also the third regulating valve 39 is released to discharge $B_2H_6$ gas from the third tank 35. The rates of discharge are regulated by mass flow controllers 41, 43, 44. $SiH_4$ gas or $SiH_4$—$B_2H_6$ mixture gas is fed through the first main pipe 45, and concurrently NO gas or CH, gas of a certain molar ratio to $SiH_4$ through the second main pipe 46, into the reaction tube 49.

The interior of the reaction tube 49 is kept vacuum, 0.1 to 2.0 Torr, the temperature of the base plate is maintained at 50° to 350° C., and high-frequency power and frequency for the capacitive type discharge electrodes 50 are set at 50 watts to 3 kilowatts and one to several tens MHz, so that glow discharge takes place and gases are decomposed, and accordingly on the base plate are formed a—Si films containing oxygen and hydrogen, and also a—Si films containing an appropriate amount of boron, at a rate of about 10 to 2500 Å/min.

Embodiments, in which the above described a—Si electrophotographic sensitive member is used in a laser line printer utilizing a semi-conductor laser beam having a transmission wave length of 770 to 780 nm as a recording member, will be below described.

EXAMPLE 1

A cylindrical aluminium substrate, which has a mirror-finished surface obtained by a super-precision lathe using a diamond cutting tool, is degreased in an alkaline solution, washed, and dried to clean, and then placed within the reaction chamber 20 of a capacitive coupling type glow discharge decomposition apparatus shown in FIG. 5.

$Al(CH_3)_3$ is introduced into the reaction tube 20 through the bubbler 28 from the fourth tank 27, with hydrogen as carrier gas, and the Al-contained layer 7 having a thickness of 0.1 μm is formed on the Al substrate by the glow discharge decomposition. The reflection factor of a semiconductor beam of 780 nm by the resulting Al-contained layer 7 is 90% (the reflection factor and transmission factor were measured using a laser beam of 780 nm in Examples 1, 2).

Subsequently, $SiH_4$ gas is discharged from the first tank 7 with hydrogen as carrier gas while $Al(CH_3)_3$ is discharged to form the a—Si intermediate layer 3 having a thickness of 1 μm by the glow discharge decomposition in which a ratio of $Al(CH_3)_3$ to the sum of $Al(CH_3)_3$ and $SiH_4$ is set at 0.0095. The transmission factor of the resulting layer is 0.37.

$SiH_4$ gas (at flow rate of 320 SCCM), with hydrogen as carrier gas, is discharged from the first tank 7, $B_2H_6$ gas (at flow rate of 80 SCCM), with hydrogen as carrier gas, from the second tank 8, and $N_2O$ gas (at flow rate of 20 SCCM) from the third tank 9 to form the barrier layer 4 on the planished cylindrical aluminium substrate 1. Starting with a composition of about 5.0 atomic % oxygen, about 0.7 atomic % nitrogen, about 200 ppm boron, and about 10 atomic % hydrogen, the composition of the barrier layer is gradually varied during the formation thereof by successively decreasing the discharge rate of $N_2O$ gas in such a way that the flow rate of $N_2O$ gas is 1.2 SCCM when the layer became 2.0 μm thick, so that the layer has maximal oxygen and nitrogen contents adjacent the interface of the substrate and has oxygen and nitrogen contents close to those of the photoconductive layer 5 as the formation of the barrier layer approaches its end. That is, adjustment is made so that the distribution of oxygen and nitrogen in the barrier layer may show an exponential curve relative to the thickness of the layer. Operating conditions during this formation stage are: discharge pressure 0.6 Torr, substrate temperature 200° C., high-frequency power 150 W, and film forming velocity 14 Å/sec.

Following this formation, the photoconductive layer 5 having a thickness of 21.8 μm and containing about 0.02 atomic % oxygen, about 0.003 atomic % nitrogen, about 200 ppm boron, and about 15 atomic % hydrogen is produced under the condition of $N_2O$ gas supply at a flow rate of 1.2 SCCM. Subsequently, flow rates are gradually varied in succession: $N_2O$ gas from 1.2 SCCM to 20 SCCM, $SiH_4$ gas from 320 SCCM to 100 SCCM, and $B_2H_6$ gas from 80 SCCM to zero, whereby the surface protective layer 6 containing about 50 atomic % oxygen, about 7 atomic % nitrogen, about 3 atomic % hydrogen, and no boron at the outer surface thereof, and having a thickness of 0.2 μm, is produced. The transmission factor of the resulting a—Si photosensitive layer is 0.26.

Figure 6:
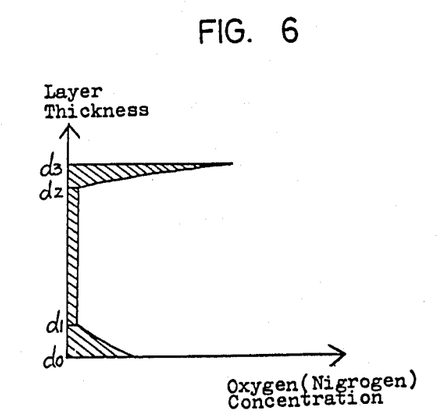
FIG. 6 is a schematic drawing showing a concentration distribution of oxygen or nitrogen along a layer thickness of an electrophotographic sensitive member according to an embodiment of the present invention.

FIG. 6 presents a schematic view showing the oxygen or nitrogen content distribution relative to layer thickness of a laminated photosensitive member formed in accordance with the above procedure. In the figure, abscissa axis denotes oxygen or nitrogen concentrations and ordinate axis denotes layer thickness of the barrier layer 4 ($d_0-d_1$), the photoconductive layer 5 ($d_1-d_2$), and the surface protective layer 6 ($d_2-d_3$).

$a \times b^2 \times c$ of an a—Si photosensitive member thus obtained amounts to 0.03. An a—Si photosensitive member thus obtained has a remarkably increased charge holding capability, shows the low dark-attenuation rate characteristics, and has a remarkably improved photosensitivity to near infrared rays. Printing tests were made with a semiconductor printer (wave length 780 nm, printing velocity 20 copies/min) using the photosensitive member thus obtained. A high-quality image having a high contrast and a high degree of resolution and being quite free from a striped pattern was obtained. Even after a 300 thousand cycle repeat test, no deterioration was observed such as decreased density, fogging in white, or void due to drum-surface flaw, and exceptional durability of the photosensitive member was confirmed.

EXAMPLE 2

By employing the glow discharge decomposition apparatus described in Example 1, photosensitive members (A) to (H) are obtained from a—Si intermediate layers having the specified Al-contents and layer thicknesses whereby having various transmission factors, and a—Si photosensitive layers having the specified compositions and thicknesses as shown in Table 1, whereby having various transmission factors. Printing tests were made with a laser line printer using a semiconductor laser beam of 780 nm as recording member using the photosensitive members thus obtained. The results are shown in Table 2.

TABLE 2

| Photo-sensitive member | Reflection factor of Al-contained layer (c) | Transmission factor of intermediate layer (b) | Transmission factor of photosensitive layer (a) | $a \times b^2 \times c$ | Evaluation of image |
|---|---|---|---|---|---|
| A | 0.9 | 0.91 | 0.33 | 0.25 | x |
| B | 0.9 | 0.86 | 0.19 | 0.13 | O |
| C | 0.9 | 0.86 | 0.10 | 0.07 | ⊚ |
| D | 0.9 | 0.55 | 0.19 | 0.05 | ⊚ |
| E | 0.9 | 0.48 | 0.10 | 0.02 | ⊚ |
| F | 0.9 | 0.32 | 0.21 | 0.02 | ⊚ |
| G | 0.9 | 0.96 | 0.19 | 0.16 | O |
| H | 0.9 | 0.96 | 0.34 | 0.28 | X |

As to the evaluation of images, mark ⊚ indicates that no striped pattern can be observed by naked eye, mark O indicating that a bad influence of a striped pattern upon an image quality desired for a photosensitive member for use in a laser line printer is almost negligible whereby no practical hindrance occurs, and mark x indicating that a bad image, on which a striped pattern appears.

As obvious from Table 2, with the photosensitive members B to G, an influence of a striped pattern generated on an image is negligible so that no practical hindrance may not occur, in particular, with the photosensitive members C to F, good-quality images having no striped pattern were obtained.

EXAMPLE 3

The relation between wave lengths of a laser beam and absorption coefficient (cm$^{-1}$) was determined with changing a ratio of Al(CH$_3$)$_3$ to the sum of Al(CH$_3$)$_3$ and SiH$_4$. The results are shown in FIG. 7.

I to VI shows an absorption coefficient curve in the event that said ratio was set at 0, 0.009, 0.010, 0.015, 0.024 and 0.048, respectively.

Figure 7:
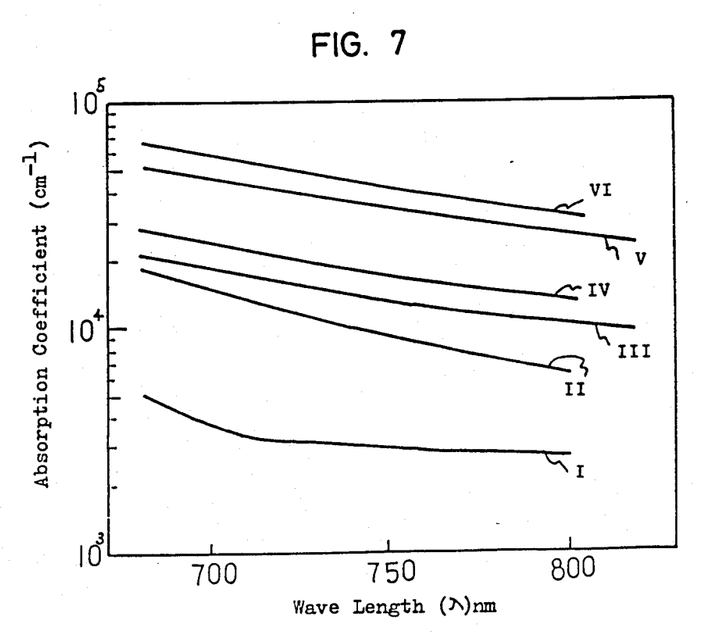
FIG. 7 is a diagram showing a relation between a wave length and an absorption coefficient for various kinds of trimethyl aluminium content in the production of an intermediate layer of an electrophotographic sensitive member according to the present invention.
Figure 8:
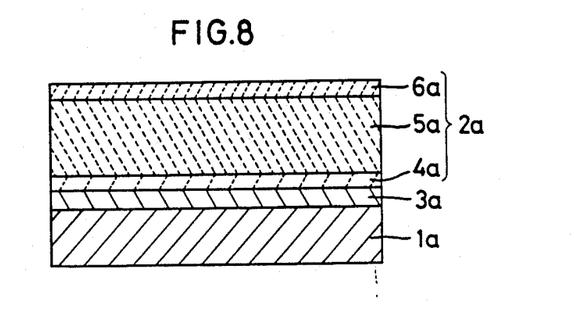

It is found from FIG. 7 that an absorption coefficient is increased with an increased of Al(CH$_3$)$_3$ content.

EXAMPLE 4

A cylindrical aluminium substrate, which has a mirror-finished surface obtained by a super-precision lathe using a diamond cutting tool, is degreased in an alkaline solution, washed, and dried to clean, and then placed within the reaction chamber 49 of a capacitive coupling type glow discharge decomposition apparatus shown in FIG. 9.

SiH$_4$ gas (at flow rate of 350 SCCM), with hydrogen as carrier gas, is discharged from the first tank 33 and GeH$_4$ gas (at flow rate of 25 SCCM), with hydrogen as carrier gas, from the second tank 34, to form an a—Si:Ge intermediate layer 3a on an Al substrate 1a by the glow discharge decomposition with setting a ratio of GeH$_4$ to the sum of SiH$_4$ and GeH$_4$ at 0.37.

The resulting intermediate layer 3a has a thickness of 1 μm and a transmission factor of a laser beam of 780 nm therethrough of 0.36.

In this Example, the reflection factor and transmission factor were measured with a laser beam of 780 nm.

Subsequently, SiH$_4$ gas (at flow rate of 350 SCCM), with hydrogen as carrier gas, is discharged from the first tank 33, B$_2$H$_6$ gas (at flow rate of 55 SCCM), with hydrogen as carrier gas, from the third tank 35, and NO gas (at flow rate of 4 SCCM), from the fourth tank 36 to form a barrier layer 4a containing about 2000 ppm boron and a thickness of 2.5 μm by the glow discharge decomposition.

The a—Si:Ge intermediate layer 3a and the barrier layer 4a were produced under the condition of gas pressure of 0.4 Torr and discharge power of 120 W.

Further in succession, SiH$_4$ gas (at flow rate of 385 SCCM, SiH$_4$ concentration of 55%), with hydrogen as carrier gas, and B$_2$H$_6$ gas (at flow rate of 2 SSCM. B$_2$H$_6$ concentration different from that used for forming the barrier layer 4a) were discharged to form a photoconductive layer 5a containing about 0.15 ppm boron and having a thickness of 25 μm by the glow discharge decomposition under the condition of discharge power of 200 W and gas pressure of 0.5 Torr.

Nextly, SiH$_4$ gas (at flow rate of 5 SCCM) and CH$_4$ gas (at flow rate of 300 SCCM) were discharged to form a SiC surface protective layer 6a having a thickness of 0.5 μm by the glow discharge decomposition under the condition of discharge power of 200 W and gas pressure of 0.4 Torr.

The transmission factor of a photosensitive layer consisting of the barrier layer 4a, the photoconductive layer 5a and the surface protective layer 6a thus obtained was 0.61.

In addition, the reflection factor of the Al-substrate 1a is 0.75, so that $a \times b^2 \times c$ amounts to 0.06. The photosensitive members thus obtained were tested on printing with a laser line printer using a semiconductor laser beam as recording member to evaluate images. No striped pattern could be observed by naked eye.

EXAMPLE 5

An a—Si:Ge intermediate layer 3a having a thickness of 1 μm was formed in accordance with the Example 4 with setting the ratio of GeH$_4$ to the sum of SiH$_4$ and GeH$_4$ at 0.28.

The transmission factor of the intermediate layer 3a thus obtained was 0.58.

Subsequently, a barrier layer 4a, a photoconductive layer 5a and a SiC surface protective layer 6a were formed in the same manner as in the Example 4 to obtain a photosensitive layer having the transmission factor of 0.67. (But the photoconductive layer 5a is 20 μm.)

In this Example, the reflection factor of an Al-substrate 1a is 0.80, so that a×b²×c amounts to 0.18. No striped pattern could be observed by naked eye alike to the Example 4.

REFERENCE EXAMPLE

An a—Si:Ge intermediate layer 3a having a thickness of 0.5 μm was formed in accordance with the Example 4 with setting the ratio of GeH₄ to the sum of SiH₄ and GeH₄ at 0.28. The transmission factor of the resulting intermediate layer 3a was 0.76.

Subsequently, a photosensitive layer, which is same as in the Example 5 (transmission factor 0.67) is formed.

In the photosensitive member thus obtained, the reflection factor of an Al-substrate is 0.80, so that a×b²×c amounts to 0.31. Printing tests were made with a laser line printer using a semiconductor laser beam of 780 nm as recording member with the photosensitive member thus obtained to evaluate images. Bad images, on which striped patterns appeared, were obtained.

EXAMPLE 6

Figure 10:
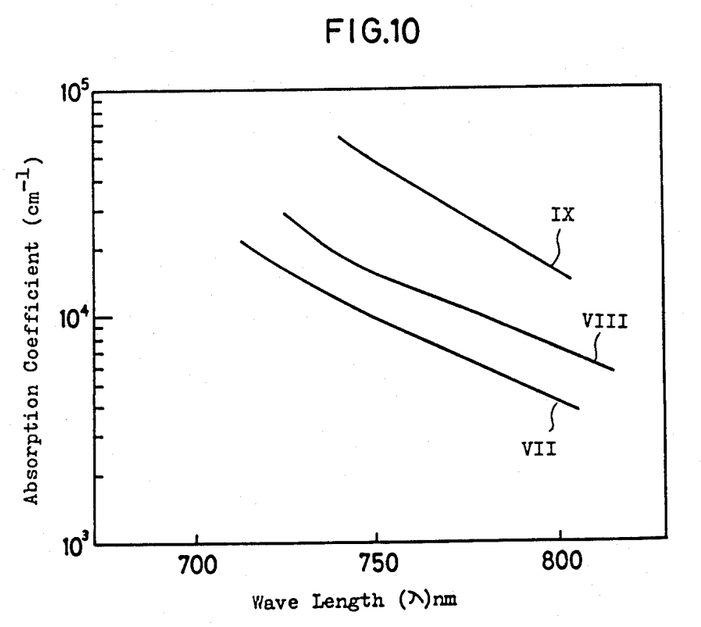
FIG. 10 is a diagram showing a relation between a wave length and an absorption coefficient for various kinds of $GeH_4$ content in the production of an intermediate layer of an electrophotographic sensitive member according to the present invention.

Absorption coefficients (cm⁻¹) for various wave lengths of laser beam were measured with changing a ratio of GeH₄ to the sum of SiH₄ and GeH₄. The results are shown in FIG. 10. VII to IX indicates an absorption coefficient curve in the event that said ratio ($\gamma$=GeH₄/(SiH₄+GeH₄)) was set at 0.28, 0.37 and 0.44, respectively.

It is found from FIG. 10 that an absorption coefficient is increased with an increase of said ratio.

As described above, with an electrophotographic sensitive member for use in a laser printer according to the present invention, good-quality images having no striped pattern were obtained by forming an intermediate layer having a comparatively large laser beam absorption capability and suitably setting the reflection factor and transmission factor of a substrate and layers.

In addition, an electrophotographic sensitive member according to the present invention is not limited to the above described Examples. It is obvious to persons skilled in the art that various kinds of photosensitive member can be obtained by forming photosensitive layers and intermediate layers of other layer structures and materials.

What is claimed is:

1. An electrophotographic sensitive member for use in reducing interference between incident light rays and reflected light rays of a laser beam, in which a photosensitive layer having at least a photoconductive layer is laminated on an electrically conductive substrate and the laser beam is incident upon a surface side of said photosensitive layer to generate an optical carrier in said photoconductive layer, wherein said photosensitive layer is formed on said electrically conductive substrate through an intermediate layer and the product a×b²×c is less than or equal to 0.2, wherein a is a transmission factor of said laser beam through said photosensitive layer, b is a transmission factor of said laser beam through said intermediate layer, and c is a reflection factor of said laser beam by said substrate.

2. An electrophotographic sensitive member as set forth in claim 1, wherein said photosensitive layer is formed of amorphous silicon.

3. An electrophotographic sensitive member as set forth in claim 1, wherein said intermediate layer is formed of amorphous silicon.

4. An electrophotographic sensitive member as set forth in claim 3, characterized by that said intermediate layer formed of amorphous silicon further contains one or more additives from the group consisting of Al, Zn, Sn, and Ge.

5. An electrophotographic sensitive member as set forth in claim 4, characterized by that said additives are further from the group consisting of Al(CH₃)₃, Al(C₂H₅)₃, Al(C₆H₅)₃, AlCl₃, Zn(CH₃)₂, Zn(C₂H₅)₂, Zn(C₆H₅)₂, Sn(CH₃)₄, Sn(C₂H₅)₄, GeH₄, Ge(CH₃)₃, and Ge(C₂H₅)₃.

6. An electrophotographic sensitive member for use in reducing interference between incident light rays and reflected light rays of a coherent light source, said member comprising:
   an electrically conductive substrate having a reflection factor equal to C;
   an intermediate layer having a transmission factor equal to A;
   an intermediate layer disposed between said electrically conductive substrate and said photosensitive layer and having a transmission factor equal to B;
   where the product $$A \times B_2 \times C$$

is less than or equal to 0.2.

7. An electrophotographic sensitive member for use in reducing the interference produced between twice reflected light rays and incident light rays of a coherent light source, the electrophotographic sensitive member comprising:
   a conductive substrate having a major surface, the conductive substrate major surface having a reflection factor of c;
   an amorphous silicon photosensitive layer, the transmissivity of light through the photosensitive layer being a,
   an intermediate layer arranged between said substrate and said photosensitive layer, the transmissivity of light through the intermediate layer being b,
   wherein the conductive substrate, photosensitive layer and intermediate layer are selected such that the product of a×b²×c is less than or equal to 0.2.

8. An electrophotographic sensitive member as set forth in claim 1, wherein the intermediate layer has an associated light-absorption coefficient and the photoconductive layer has an associated light-absorption coefficient and wherein the light absorption coefficient associated with the intermediate layer is greater than the light-absorption coefficient associated with the photoconductive layer.

9. A method of reducing interference between incident light rays and reflected light rays of a coherent light source in an electrophotographic member, said method comprising the steps of:
   selecting as a first element of said electrophotographic member an electrically conductive substrate having a reflection factor equal to C;
   selecting as a second element of said electrophotographic member a photosensitive layer having a transmission factor equal to A;
   selecting as a third element of said electrophotographic member an intermediate layer disposed between said electrically conductive substrate and said photosensitive layer and having a transmission factor equal to B;
   where the product $A \times B_2 \times C$ is less than or equal to 0.2.

* * * * *